(12) United States Patent
Lally

(10) Patent No.: US 7,429,290 B2
(45) Date of Patent: *Sep. 30, 2008

(54) FIRE-RETARDANT COATING, METHOD FOR PRODUCING FIRE-RETARDANT BUILDING MATERIALS

(76) Inventor: Thomas Joseph Lally, 603 Mallord La., Oak Brook, IL (US) 60523

( * ) Notice: Subject to any disclaimer, the term of this patent is extended or adjusted under 35 U.S.C. 154(b) by 191 days.

This patent is subject to a terminal disclaimer.

(21) Appl. No.: 11/156,395

(22) Filed: Jun. 20, 2005

(65) Prior Publication Data

US 2005/0229809 A1    Oct. 20, 2005

Related U.S. Application Data

(60) Continuation-in-part of application No. 10/818,268, filed on Apr. 5, 2004, now abandoned, which is a continuation-in-part of application No. 10/338,425, filed on Jan. 8, 2003, now Pat. No. 6,787,495, which is a division of application No. 09/602,067, filed on Jun. 22, 2000, now Pat. No. 6,533,821, application No. 11/156,395, which is a continuation-in-part of application No. PCT/US2005/011556, filed on Apr. 5, 2005.

(51) Int. Cl.
C09D 5/00    (2006.01)
C09D 5/18    (2006.01)
C09K 21/00    (2006.01)
C09K 21/04    (2006.01)

(52) U.S. Cl. ...................... 106/18.14; 252/601; 252/607
(58) Field of Classification Search ............. 106/18.14; 252/601, 607

See application file for complete search history.

(56) References Cited

U.S. PATENT DOCUMENTS

| 4,871,477 | A | * | 10/1989 | Dimanshteyn | ............... 252/609 |
| 5,194,087 | A | * | 3/1993 | Berg | ....................... 106/18.12 |
| 6,090,315 | A | * | 7/2000 | Bai | ............................ 252/601 |
| 6,787,495 | B2 | * | 9/2004 | Lally | ........................... 501/111 |
| 7,045,476 | B1 | * | 5/2006 | Lally | ........................... 501/111 |

\* cited by examiner

*Primary Examiner*—Elizabeth D Wood

(57) ABSTRACT

The present invention relates to a fire-resistant coating and method thereof, which confers enhanced flame and heat resistance to substrate such as building materials. The invented coating is especially applicable to cellulose-based building materials including but not limited to fiberboards, wallboards, roofing materials, particleboards, ceiling tiles, soundproofing boards and hardboards. This novel composition is also useful in providing a fire-resistant coating for concrete, metals, foamed polymeric materials, gypsum and other substrates. A preferred embodiment generally comprising: mono potassium phosphate, magnesium oxide, silica powder, calcium silicate, rice hull ash and water. A method for imparting fire-retardancy to substrates using the invented composition is also described.

15 Claims, No Drawings

FIRE-RETARDANT COATING, METHOD FOR PRODUCING FIRE-RETARDANT BUILDING MATERIALS

RELATED PATENT APPLICATIONS

The current application is a continuation-in-part application of, U.S. patent application Ser. No. 10/818,268 filed on Apr. 5, 2004 and now abandoned, which is a continuation-in-part of and seeks priority to U.S. patent application Ser. No. 10/338,425, filed on Jan. 8, 2003, now U.S. Pat. No. 6,787,495 which is a divisional of U.S. patent application Ser. No. 09/602,067, filed on Jun. 22, 2000, now U.S. Pat. No. 6,533,821. The current application is also a continuation-in-part and claims priority to PCT Application No. PCT/US2005/011556 filed on Apr. 5, 2005, which in turn claims priority of U.S. patent application Ser. No. 10/818,268 filed on Apr. 5, 2004 and now abandoned.

TECHNICAL FIELD

The present invention relates to a fire-retardant material. More specifically, the present invention relates to a fire-retardant coating that shields underlying substrates from thermal insult. The invented coating is especially applicable to cellulose-based building materials including, but not limited to: fiberboards, wallboards, roofing materials, particleboards, ceiling tiles, soundproofing boards and hardboards. This novel composition is also useful in providing a fire-resistant coating for concrete, metals, foamed polymeric materials (i.e. styrofoam), gypsum, synthetics and other substrates.

BACKGROUND ART

Cellulose-based products made from cellulosic fibers, chips and shavings make up a significant portion of the building product market because they are cost effective, and easy to work with. Cellulose-based products provide structural support, act as roofing substrates, and even dampen unwanted noise. Unfortunately, untreated cellulose-based products are particularly susceptible to flame and thermal damage because they are composed of flammable fibers or particles. A number of coatings have been developed to reduce the flammability of such materials, but too often these methods are inadequate at providing fire-retardancy, are too expensive, produce toxic-off gas or smoke under continued exposure to flame, or have some other shortcoming. A need exists for a cost effective, thin ceramic coating for cellulose-based materials which can impart Class A flame resistance.

For example, U.S. Pat. No. 5,035,851, issued to Dimanshtaeyn describes a fire-resistant coating comprising: a silicate, a clay and some inorganic materials (e.g. a borate) which can be used to coat metals, woods and foamed polymeric materials to impart some degree of fire resistance thereto. This is a complicated and expensive solution and acceptable resistance to fire is not always achieved.

A need exists for fire-retardant coating for building materials that is cost effective, non toxic and which provides superior fire-retardancy.

SUMMARY OF THE INVENTION

The present invention relates to a fire-resistant coating and method thereof, which confers enhanced flame and heat resistance to various substrates and materials. Exemplary materials include steel, various ferrous and non-ferrous metals, woods, gypsums, composites of wood and cellulose, concrete, mortars, and synthetic products, including plastics, paper and carbon composites. The present invention is especially well suited for coating cellulose or lignin-cellulose based building materials like fiberboards, particleboards, and medium density fiberboard (MDF) and a method for manufacturing and using the same. The invented coating generally comprises: a phosphate, a metal oxide, at least one silica containing compound, a metal silicate, and an aqueous solution.

The present invention provides a light-weight formulation to coat building materials. A feature of the formulation is that it thermally insulates building materials from heated fluids having high temperatures. An advantage of one embodiment of the invention is that it provides superior thermal and flame protection in line with a Class A fire rating at a cost effective price and with use of a very thin coating.

An advantage of one embodiment of the present invention is to provide a ceramic-based film which can be use to impart thermal and structural integrity to an underlying substrate. A feature of one embodiment of the film is it ability to impart structural rigidity to the substrate while also increasing heat and flame resistance.

Like other compositions developed by the instant inventor, the presently invented composition is a multi-purpose material that can be used in a variety of ways including but not limited to: a coating, binder, adhesive, cement, mortar, underlayment and patching material. A myriad of aggregates and additives can be added to the composition to create various products including, but not limited to: tile, sculpture, terrazzo, refractories, under-layments, flooring, siding, roofing, countertops, overlayment, patching material, environmental materials, safety tiles, architectural products, building materials, fire-resistant protectants, pervious concrete and cement, toxic and environmental remediation products, panels, and medical and dental applications. The present invention can also be used as a multi-purpose composition multi-purpose binder system. Still another object of the invention is to provide an adhesive which can be used for a variety of uses including binding fiberboards together.

The invention also provides a method for preparing fire-retardant building materials.

DETAILED DESCRIPTION OF THE PREFERRED EMBODIMENTS

One preferred formulation of the fire-retardant coating generally includes the following:

| Formulation I | |
|---|---|
| $KH_2PO_4$ ("MKP") | 35 weight percent of the dry mixture |
| MgO | 17 weight percent of the dry mixture |
| Silica containing compound(s)(i.e. $SiO_2$) | 35 weight percent of the dry mixture |
| Metal Silicates(s) (i.e. $CaSiO_3$) | 13 weight percent of the dry mixture |
| Water is added at approximately 30-35 weight percent of the dry mixture. | |

The MKP, MgO, a silica containing compound (i.e. $SiO_2$), and at least one metal silicate ($CaSiO_3$) are mixed together in powder form to create a homogeneous dry mixture. Obtaining a homogenous dry mixture can be accomplished through a number of techniques well known in the art including but not limited to ribbon mixing. See, U.S. patent application Ser. No. 09/602,067, now U.S. Pat. No. 6,533,821 filed by instant inventor on Jun. 22, 2000, and incorporated herein by reference in its entirety. Although dry components are disclosed herein, other forms of the components may be utilized.

The dry mixture is mixed with an aqueous solution (i.e. water) to form a slurry. In Formulation I, water is added at 30-35 weight percent of the dry mixture, however, water can be added at various percentages, preferably between 15 and 55 weight percent of the dry mixture. Water can be supplemented or replaced by various aqueous solutions including but not limited to: phosphoric acid, acid solutions and solutions containing phosphoric acid salts or equivalents.

The slurry is mixed until a homogeneous slurry is obtained. Suitable mixing times for most applications are between 30 seconds and 10 minutes, although shorter and/or longer mixing times can be used as long as a good mixture is obtained. Mixing can be achieved using several techniques well known in the art including but not limited to mixing by hand, using an electronic hand mixer or commercial mixer. The slurry is generally produced at the user site.

Alternatively, the dry mixture and water can be mixed using various spray technologies where the water and dry mixture are mixed prior to, or after release from the spraying apparatus. Other mixing techniques and composition preparations can also be envisioned. In addition to a sprayable form, various other forms of the composition can be created including but not limited to cementious forms and puddies. The form of the material can be manipulated in a variety of ways including varying the amount of water. It is preferred to mix the components before spraying.

The reactivity and pot life of the slurry can be controlled by the addition of various setting regulators. Suitable setting retarders include but are not limited to: boric acid and other known setting retarders.

A variety of known setting accelerators can also be employed, including but not limited to: phosphoric acids, and acid solutions containing phosphate salts. Pot life can also be controlled by other techniques known in the art such as controlling the particle size, substitution of less reactive or more reactive components and temperature of the reactants.

As noted, the temperature of the aqueous solution and other components can be used to regulate reactivity and pot life. A suitable temperature range for the water is generaly between 40-90° F.). The temperature of the water is related to the mixture's reactivity, thus the rate of the reaction can be controlled to some degree by the temperature of the water (or other solution) being added. Hot water tends to speed up the reaction while cool water tends to slow it down. It should be noted that the temperature of all other reagents in the present invention were at approximately room temperature (about 68° F.), although reagents having different temperatures can be used. The temperature of the reagents, like that of water, affects the reactivity of the slurry. Hotter reagents tend to speed up the reaction while cool reagents tend to slow it down.

While the above-mentioned formulation and weight percents are the most preferred proportions, a range of the constituents can also used.

The following weight percents are based on the weight of the combined dry mixture. In one embodiment exemplary ranges include but are not limited to: generally between about 15-45 weight percent mono potassium phosphate ("MKP"), preferably approximately 20-45 weight percent MKP, even more preferably approximately 30-40 weight percent. The phosphate may be added up to about 60 (or even about 70 weight) percent of the dry mixture.

The MgO (metal oxide) can also be utilized in varying weight percents. The metal oxide may be generally added at between 5 and 50 weight percent. One preferred range of the metal oxide is between approximately 5 and 35 weight percent, more preferably between approximately 10-25 weight percent, even more preferably approximately 15-20 weight percent.

The silica containing compound should generally be present at between approximately 15-45 weight percent, preferably at approximately 20-40 weight percent, even more preferably at approximately 30-40 weight percent. The silica containing compound is preferably added at a weight of 15 weight percent or greater to enhance the fire-protection and increase the adhesive ability of the fire coating. Using less silica (1-25 weight percent) is envisioned for certain applications.

An exemplary range for the silicate(s) is between about 1-45 weight percent, preferably between about 5-20 weight percent, more preferably between about 10 and 20.

Percentages may vary when various fillers, additives and/or aggregates are added or as conditions or desired results change.

The reaction between the metal oxide and phosphate is salient feature of the invention. Increasing the percentage of metal oxide (i.e. MgO), especially in relation to the phosphate (i.e. MKP) generally tends to increase the speed of the reaction and decrease pot life. Reducing the amount of metal oxide has the opposite effect.

A salient aspect of the invention is the weight ratio of the phosphate (i.e. MKP) to metal oxide (i.e. MgO). A suitable ratio is between 0.5:1 and 4:1, more preferably in a ratio between 1:1 and 3:1, even more preferably at a weight ratio of approximately 2:1. This weight ratio is important as compositions having a weight ratio less than 0.5:1 (i.e. between MKP and MgO) have very short setting times and high setting temperatures. Composition having weight ratios above 4:1 (i.e. between MKP and MgO) tend to react very slowly and have lower compressive strength and possibly less adhesive ability.

It may be possible to use ratio outside these guidelines using various setting agents and or additives, or by manipulating the composition with the addition of various metal salts, carbonates, sulfates and equivalents, especially those containing K and/or Mg.

Dry Mixture Components

One salient feature of the present invention is a metal oxide. MgO is the preferred metal oxide, however, other metal oxides may be used including but not limited to: alkali metal and alkali earth metal oxides, hydroxides, and equivalents including but not limited to: iron oxides, aluminum oxides, zinc oxides, aluminum hydroxides, zirconium oxides, zirconium hydroxides, calcium oxides, calcium hydroxides, aluminum oxides, and combinations thereof.

Preferably the MgO is light burned and is a powder having a particle size of between 20-200 microns.

Another salient feature of the present composition is a phosphate compound, preferably a potassium phosphate, more preferably mono potassium phosphate ("MKP"). Other phosphates include but are not limited to: phosphoric acid, and phosphoric acid salts. Suitable phosphoric acid salts include but are not limited to: mono-ammonium phosphate, di-ammonium phosphate, aluminum phosphate, sodium phosphate, and combinations thereof. Preferably the MKP is a tech grade powder or granule with a particle size between 20-100 microns, although a variety of forms can be envisioned.

The addition of a silica containing compound is an important aspect of the invention. The silica containing compound can be selected from a variety of silica containing compounds known in the art. Preferably, the silica containing material has a silica content of 40% or greater, more preferably a silica content of approximately 60% or higher. It is also preferable to have a silica material having a particle size of approximately 30 microns or less. The silica containing material is preferably silica powder ($SiO_2$). It is believed that the silica containing compound improves the reaction between the phosphate and oxide, the compositions adhesion to the substrate, and the fire-resistance of the composition.

Other suitable silica containing compounds including but not limited to: silica fume, rice hull ash, granite dust, glasses, crushed glasses, kyanite, mullite, sand, clay, cenospheres, bauxite, and mixtures thereof can also be employed in addition to, or in place of, silica powder. Certain fly ashes may also be employed. While fly ashes are good in that they reduce cost and are environmentally favorable as a recycled material, they can sometimes lead to inconsistencies in appearance and performance of the coating.

The addition of a metal silicate to the dry mixture enhanced the fire and flame retardancy of the final product. Suitable silicates can be used including: alkali metal and alkali earth metal silicates, aluminum silicate, alumina silicate, calcium silicate, magnesium silicates, talc, olivine, equivalents and combinations thereof. The silicate is believed to significantly enhances the fire-retardancy and adhesion of the invented material and is a salient aspect of the invention.

The metal silicate of the present invention is preferably $CaSiO_3$. An exemplary calcium silicate is VANSIL. RTM. W-10 from R.T. Vanderbilt Company (Norwalk, Conn.). The addition of calcium containing compounds such as calcium silicate sometimes cause the slurry to coagulate. To minimize coagulation various known flow agents can be added. The flow agents are generally added at between approximately 1-10 percent, although this range is merely exemplary.

Although, dry components are disclosed, a variety of forms of the components can be envisioned and may be employed.

| Formulation II | |
|---|---|
| MKP | 40 weight percent of the dry mixture |
| MgO | 35 weight percent of the dry mixture |
| $SiO_2$ | 20 weight percent of the dry mixture |
| $CaSiO_3$ | 5 weight percent of the dry mixture |

Water is added at between about 15 and 55 weight percent of the dry mixture. Preferably water is added at approximately 35 weight percent of the dry mixture.

It was found that the addition of rice hull ash to the mixture produced a coating with enhanced bonding and fire-retardancy properties. The addition of the rice hull ash improved the fire-retardancy of the material to a surprising degree. An exemplary formulation of this embodiment is shown below:

| Formulation III | |
|---|---|
| MKP | 35 weight percent of the dry mixture |
| MgO | 17 weight percent of the dry mixture |
| $SiO_2$ | 27 weight percent of the dry mixture |
| $CaSiO_3$ | 7 weight percent of the dry mixture |
| Rice Hull Ash | 8 weight percent of the dry mixture |
| Olivine | 6 weight percent of the dry mixture |

Water is added at between about 15 and 55 weight percent of the dry mixture. Preferably water is added at between about 30-40 weight percent, and more preferably approximately 35 weight percent of the dry mixture. Olivine was added to improve the flowability of the mixture.

It was found that addition of a boric acid solution in the amount of up to a few percent, preferably around 0.25%-1.00%, may be added to increase the pot life of the slurry.

The boric acid solution is preferably comprised of: boric acid and a sugar (i.e. table sugar) or other sugar, sugar derivative, related substance or combination thereof. The weight percent ratio between the boric acid and sugar is suitably between 1:4 and 4:1, preferably between 2:1 and 1:2, more preferably at a ratio of approximately 1:1. The boric acid/sugar mixture has been developed by inventor as a cost effective, easy to use, multi-purpose retarder.

It was also found that silicates could supplemented or substituted by a calcium phosphate, derivative or equivalent, preferably a tri-calcium phosphate compound.

A suitable tri-calcium phosphate compound is a tri-calcium phosphate (TCP) sold by Astaris (St. Louis, Mo.) An exemplary formulation of this embodiment is shown below:

| Formulation IV | |
|---|---|
| Potassium Phosphate | 40 weight percent of the dry mixture |
| MgO | 20 weight percent of the dry mixture |
| $SiO_2$ | 35 weight percent of the dry mixture |
| Tri-calcium Phosphate | 5 weight percent of the dry mixture |

Water is added at between about 15 and 55 weight percent of the dry mixture. Preferably water is added at approximately 35 weight percent of the dry mixture. Like the other formulations rice hull ash may be added to increase the fire-retardancy and adhesive characteristics of Formulation IV.

In an alternate embodiment silica sand was added to the formulation imparting a harder coating with improved structural qualities.

| Formulation V | |
|---|---|
| MKP | 20 weight percent of the dry mixture |
| MgO | 10 weight percent of the dry mixture |
| $SiO_2$ | 15 weight percent of the dry mixture |
| $CaSiO_3$ | 5 weight percent of the dry mixture |
| Silica Sand | 50 weight percent of the dry mixture |

Water is added in between about 15 and 55 weight percent of the dry mixture. Preferably water is added at approximately 35 weight percent of the dry mixture. When the above-mentioned formulations it may be helpful to blow heated air (i.e. 120° F.) onto the surface of the finished product to encourage setting.

| Formulation VI | |
|---|---|
| MKP | 20 weight percent of the dry mixture |
| MgO | 20 weight percent of the dry mixture |
| $CaSiO_3$ | 10 weight percent of the dry mixture |
| Crushed Glass | 50 weight percent of the dry mixture |

Water is added in between about 15 and 55 weight percent of the dry mixture. Preferably water is added at approximately 35 weight percent of the dry mixture. When the above-mentioned formulations it may be helpful to blow heated air (i.e. 120° F.) onto the surface of the finished product to encourage setting.

Application of Fire-Retardant

The compositions of the present invention can be applied to substrates by any technique well known in the art including but not limited to: spraying, rolling, brushing, dripping, painting, trolling, and dip coating. Applying the different components of the composition to the substrate in succession can be envisioned. The techniques will vary according to desired results.

When applied to cellulose based (or other fibrous) materials, the composition can be made to partially impregnate the substrate. Impregnation will be encouraged if the slurry is applied to the substrate while it is still in a semi-wet or doughy state. Retention by the substrate can be promoted further by using sizing agents, polymer coatings and retention agents.

The setting time of the slurry will depend on a number of factors including reagent and water temperatures and slurry thickness. The slurry will generally cure faster with increased thickness. High temperature reagents will tend to speed up the slurry reaction and cause it to cure at an increased rate. Curing will result in a fire-resistant coating upon the substrate.

An important aspect of the invention is the amount of material applied to a substrate relative to the surface area of the substrate (i.e. fiberboard). This ratio of weight of invented material/surface area of substrate generally correlates to the thickness of the coatings. Testing revealed superior fire retardancy of substrates having the invented coating. It is assumed that at least approximately 10 grams per square foot of material surface is necessary to impart satisfactory fire-retardancy, although lesser and greater amounts may be employed. A suitable, range is between 10-200 grams/sq. ft, preferably between 30-100 grams/sq. ft. Of course, the amount of material per surface area can be adjusted for desired results. Results may vary according to conditions. Thicker coatings may be desired for certain applications including but not limited to those that require additional structural strength, or when the coating is used as an adhesive.

One method of applying the composition generally comprises the following:

a. applying the invented composition to at least one surface of a substrate (i.e. fiberboard) in an defined amount of composition per square foot of substrate surface, and;
b. drying the substrate.

The coated substrate can be dried by a myriad of drying means: including but not limited to use of ovens, series of ovens, and commercial drying equipment.

As noted above the composition can be applied to the surface of the substrate in a variety of ways known in the art including spraying. The slurry components can be mixed prior to spraying, mixed within the spraying apparatus or mixed after exit from the spray nozzle. As noted earlier a salient aspect of the process is the thickness (weight of slurry material/sq. ft) of the coating. In most cases it is preferable to coat the surface in a uniform or near uniform thickness.

Sample R1-172

Dry mix formulation III described above was mixed with approximately 35 weight percent water using commercial shotcrete/gunite equipment manufactured by RFI construction Products (Farmingdale, N.Y.). 0.5% weight percent of a boric acid/sugar solution (in a weight percent ratio of 1:1) was added to the slurry to increase the pot life of the material. The slurry mixture was then pumped (using the same shotcrete/gunite equipment) into four, ¼" air atomizing nozzles and sprayed on to the surface of met-mat (≈50% water content), post-press, pre-dryer, ⅜" thick fiberboard. The slurry was applied to the fiberboard at about 172 grams/sq. ft. The coated board was then run through a series of drying ovens.

Sample R2-100

Dry mix formulation III described above was mixed with approximately 35 weight percent water using commercial shotcrete/gunite equipment manufactured by RFI construction Products (Farmingdale, N.Y.). 0.5% weight percent of a boric acid solution acid/sugar solution (in a weight percent ratio of 1:1) was added to the slurry to increase the pot life of the material. The slurry mixture was then pumped (using the same shotcrete/gunite equipment) into four, ¼" air atomizing nozzles and sprayed on to the surface of met-mat (≈50% water content), post-press, pre-dryer, ⅜" thick fiberboard. The slurry was applied to the fiberboard at approximately 100 grams/sq. ft. The coated board was then run through a series of drying ovens.

Sample R3-63

Dry mix formulation III described above was mixed with approximately 35 weight percent water using commercial shotcrete/gunite equipment manufactured by RFI construction Products (Farmingdale, N.Y.). 0.5% weight percent of a boric acid solution acid/sugar solution (in a weight percent ratio of 1:1) was added to the slurry to increase the pot life of the material. The slurry mixture was then pumped (using the same shotcrete/gunite equipment) into four, ¼" air atomizing nozzles and sprayed on to the surface of met-mat (≈50% water content), post-press, pre-dryer, ⅜" thick fiberboard. The slurry was applied to the fiberboard at approximately 63 grams/sq. ft. The coated board was then run through a series of drying ovens.

Sample R4-47

Dry mix formulation III described above was mixed with approximately 35 weight percent water using commercial shotcrete/gunite equipment manufactured by RFI construction Products (Farmingdale, N.Y.). 0.5% weight percent of a boric acid acid/sugar solution (in a weight percent ratio of 1:1) solution was added to the slurry to increase the pot life of the material. The components were mixed for approximately 5-15 minutes, or until a uniform slurry is achieved. The slurry mixture was then pumped (using the same shotcrete/gunite equipment) into four, ¼" air atomizing nozzles and on to the surface of met-mat (≈50% water content), post-press, pre-dryer, ⅜" thick fiberboard. The slurry was applied to the fiberboard at approximately 47 grams/sq. ft. The coated board is then run through a series of drying ovens.

Results

ASTM E84-04 was followed to test the coated fiberboard samples as described above. ASTM E84-04 determines the surface burning characteristics of a material, specifically the flame spread and smoke developed indices when exposed to fire. The maximum distance the flame spreads along the length of the sample from the end of the igniting flame is determined by observation. The Flame Spread Index (FSI) of the material is determined by rounding the Calculated Flame Spread (CFS) as described in UL 723, which is hereby incorporated by reference in its entirety. The CFS is derived from plotting the progression of the flame front on a time-distance scale, ignoring any flame front recession, and using one of the calculation methods. The Smoke Developed Index (SDI) is determined by rounding the Calculated Smoke Developed (CSD) as described in UL 723.

Table I includes the ASTM E84-04 test results for the above-described samples. The results of the tests illustrate the extraordinary flame protection imparted by the invented fire-retardant composition. All of the samples performed extremely well in the tests, indicating retardancy in line with a Class A rating for flame spread. All four samples had a flame spread index of less than or equal to 5 and a smoke development index of equal or less than 15. Sample R3-63 had a superior flame index of 0. The ability of the invented product to impart superior flame retardancy using such a thin coat of material is extraordinary and unexpected. The test results attest to the unique characteristics of the invented material.

Surprisingly, the two thinner coated samples (R3-63 and R4-47) outperformed the samples with the thicker fire-retardant coatings. Although all the samples performed exemplary, the thicker coatings appeared to crack slightly causing a marginal increase in flame spread and smoke development. There appears to be a balance between applying enough composition to impart satisfactory retardancy with applying too much composition that the coating cracks. However, thicker coatings may be desired for certain applications including but not limited to those that require additional structural strength, or when the coating is used as an adhesive, binder or other form.

TABLE I

ASTM-E84-04 Results

| Sample | CFS Calculated Flame Spread | FSI Flame Spread Index | CSD Calculated Smoke Developed | SDI Smoke Developed Index |
|---|---|---|---|---|
| R1-172 | 5.4 | 5 | 16.7 | 15 |
| R2-100 | 4.0 | 5 | 8.5 | 10 |
| R3-63 | 1.5 | 0 | 8.8 | 5 |
| R4-47 | 3.5 | 5 | 2.7 | 5 |

TABLE II

Flame Spread Results- R1-172

| Distance (ft.) | Time (sec) |
|---|---|
| 0.00 | 104 |
| 0.50 | 122 |
| 1.00 | 149 |
| 1.50 | 312 |

TABLE III

Flame Spread Results- R2-100

| Distance (ft.) | Time (sec) |
|---|---|
| 0.00 | 231 |
| 0.50 | 253 |
| 1.00 | 308 |
| 1.50 | 345 |

TABLE IV

Flame Spread Results- R3-63

| Distance (ft.) | Time (sec) |
|---|---|
| 0.00 | 245 |
| 0.50 | 263 |

TABLE V

Spread Results - R4-47

| Distance (ft.) | Time (sec) |
|---|---|
| 0.00 | 188 |
| 0.50 | 218 |
| 1.00 | 261 |
| 1.50 | 55 |

Alternate Embodiments

The present invention can be combined with a myriad of other method, binders, cements, coatings, additives, insulators, setting regulators, fillers, surfactants, buffers, dispersants, insulators, wetting agents, hardening agents, aggregates and combinations thereof. Other additives are known or could be envisioned.

Various charring agents (i.e. starch) can be added to the present invention to provide additional fire protection. The charring agents form another layer of protection when exposed to flame. Such charring agents are especially important if the composition is being used to make a intumescent paint or coating.

The present invention is particularly well suited to be used in conjunction a method developed by instant inventor disclosed PCT Patent Application No. PCT/US2004/037261, which is hereby incorporated by reference in its entirety.

A variety of aerating agents can be added to the invented composition. Suitable aerating agents include but are not limited to: carbonates, bicarbonates, such as calcium carbonate, sodium carbonate, sodium bicarbonate, calcium bicarbonate, starch, baking soda, baking powder, equivalents and combinations thereof.

Like other compositions developed by the instant inventor, the presently invented composition is a multi-purpose material that can be used in a variety of ways including but not limited to: a coating, binder, adhesive, cement, mortar, under-layment and patching material. A myriad of aggregates and additives can be added to the composition to create various products including, but not limited to: tile, sculpture, terrazzo, refractories, under-layments, flooring, siding, roofing, countertops, overlayment, patching material, environmental materials, safety tiles, architectural products, building materials, fire-resistant protectants, pervious concrete and cement, toxic and environmental remediation products, panels, and medical and dental applications. Inventor's previous patents and patent applications are hereby incorporated by reference in their entireties, including: U.S. Pat. No. 6,533,821 issued on Mar. 18, 2003, U.S. Pat. No. 6,787,495, issued on Sep. 9, 2004; U.S. patent application Ser. No. 10/685,214 filed on Oct. 14, 2003, U.S. patent application Ser. No. 10/818,268 filed on Apr. 5, 2004.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

I claim the following:

1. A fire-retardant composition: comprising the following:
   mono-potassium phosphate,
   a metal oxide,
   at least one silica containing compound; and
   a metal silicate
   wherein the ratio of mono-potassium phosphate to metal oxide is between about 3:1 and 1:1.

2. The fire-retardant composition of claim 1, further comprising water.

3. The fire-retardant composition of claim 1, wherein the phosphate is present at between 10-45 weight percent, the metal oxide is present at about 5-35 weight percent, the silica containing compound at between 15-45 weight percent, and the metal silicate present at between 1-45 weight percent.

4. The fire-retardant composition of claim 1, wherein the weight percent ratio of the phosphate to metal oxide is between about 1:1 and 2:1.

5. The fire-retardant composition of claim 1, further comprising at least one selected from the group consisting of: charring agents, setting retarders, setting accelerants, additives, aggregates, surfactants, wetting agents, hardening agents, insulators, buffers, adhesive agents, fillers, aerating agents and mixtures thereof.

6. The fire-retardant composition of claim 1, wherein the metal oxide is magnesium oxide.

7. The fire retardant composition of claim 1, wherein the silicate is $CaSiO_3$.

8. The fire retardant composition of claim 1, wherein the silica containing compound is selected from the group consisting of: silica powder, silica fume, fly ash, granite dust, volcanic glasses, kyanite, mullite, sand, clay, cenospheres, ceramic-spheres, bauxite, and mixtures thereof.

9. The fire retardant composition of claim 1, wherein the silica containing compound is silica powder.

10. A fire-retardant composition comprising: mono potassium phosphate, magnesium oxide, calcium silicate, silica powder, and rice hull ash, wherein the weight percent ratio between mono potassium phosphate and magnesium oxide is between about 1:1 and 3:1.

11. The fire-retardant composition of claim 10, wherein the mono potassium phosphate is present at between 15-45 weight percent, the magnesium oxide is present at about 5-35 weight percent, the calcium silicate present at between 1-45 weight percent, the silica powder at between 5-44 weight percent, and the rice hull ash at between 1-40 weight percent.

12. The fire-retardant composition of claim 10, wherein the mono potassium phosphate is present at between about 20-45 weight percent, the magnesium oxide is present at about 10-25 weight percent, the calcium silicate is present at between about 5-20 weight percent, the silica powder at between 19-39 weight percent and the rice hull ash as between 1-15 weight percent.

13. The fire-retardant composition of claim 10, wherein the mono potassium phosphate is present at between about 30-45 weight percent, the magnesium oxide is present at about 15-20 weight percent, the calcium silicate is present at between about 5-10 weight percent, the silica powder at between 25-30 weight percent and the rice hull ash as between 5-10 weight percent.

14. The fire-retardant composition of claim 10, further comprising olivine.

15. The fire-retardant composition of claim 10, further comprising an aqueous solution.

* * * * *